July 18, 1950      P. O. MORRISON, JR      2,515,729
BRAKING SYSTEM
Filed Aug. 27, 1946
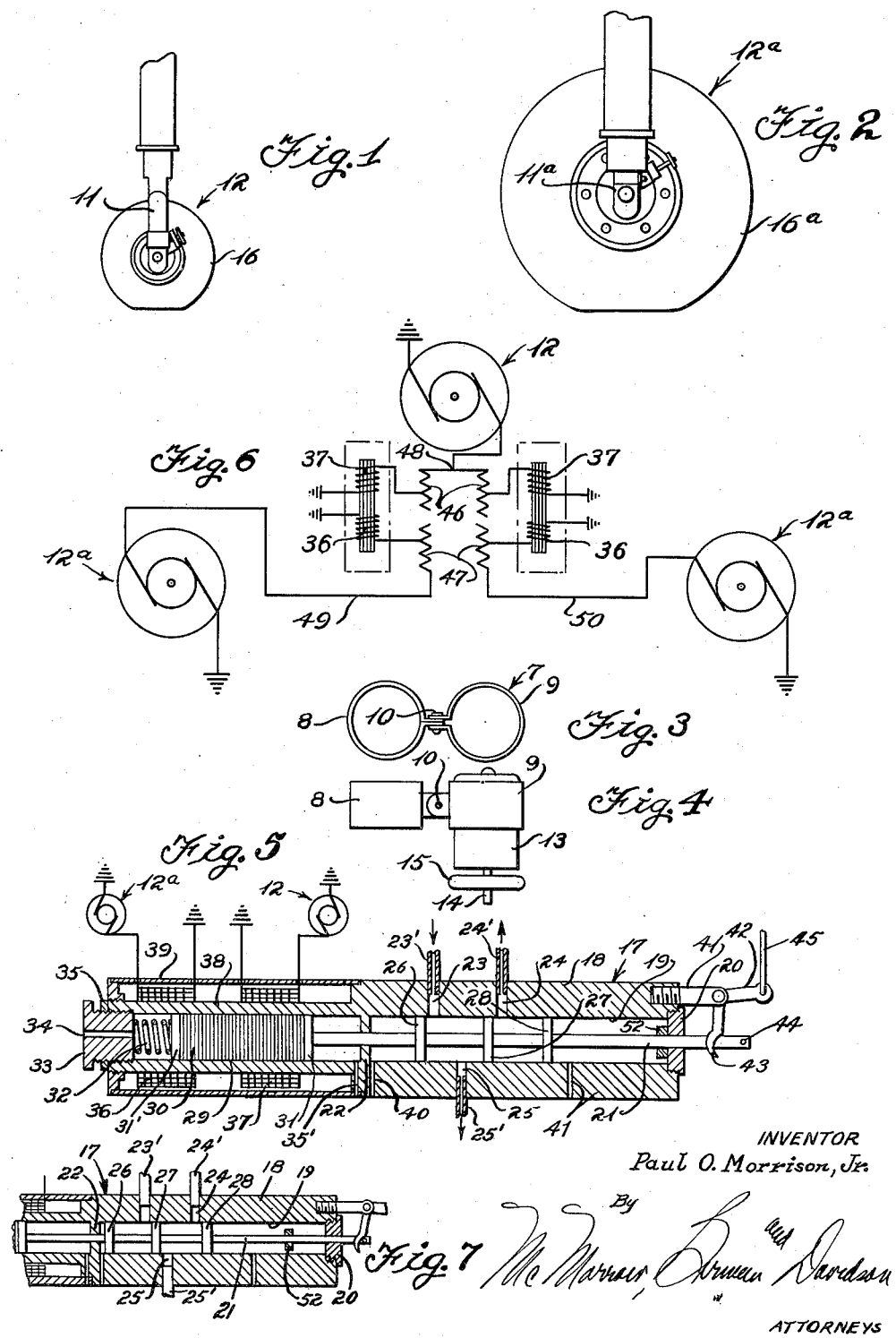
INVENTOR
Paul O. Morrison, Jr.

Patented July 18, 1950

2,515,729

UNITED STATES PATENT OFFICE 2,515,729

BRAKING SYSTEM

Paul O. Morrison, Jr., Norman, Okla.

Application August 27, 1946, Serial No. 693,216

2 Claims. (Cl. 244—111)

This invention relates generally to braking systems for vehicles, including airplanes, railway engines and cars, and the like; and more particularly to electrically operated means adapted for incorporation in hydraulic and air braking systems whereby slippage of any of the braked wheels of the vehicle in contact with the ground is automatically relieved by release of the hydraulic brake operating pressure in such wheel or wheels.

The primary object of this invention is to provide an electrically controlled hydraulic braking system of the character indicated above which is simple in design, positive in action, and in which full brake pressure is on when the vehicle is standing and/or the system is at rest; and which requires no special technical skill for its installation and maintenance.

Another important object of this invention is to provide an electrically controlled braking system of the character indicated above which when applied to airplanes, substantially improves brake operation on snow or ice-covered runways, and which can be independent of the electrical system of the airplane.

A further important object of this invention is to provide a braking system of the character indicated above which, although normally automatic in action, includes positive emergency control means which are operable to override the automatic action.

A still further important object of this invention is to provide electrically operated braking system control means of the character indicated above which can be incorporated in or applied to railway air brake systems, so as to prevent wheel sliding and consequent flat spots on the wheels of locomotives and cars.

Other important objects and advantages of this invention will be apparent from the following description and the drawings appended thereto, wherein, merely for purposes of disclosure herein, specific embodiments of the invention are set forth in detail.

In the drawings:

Figure 1 is a fragmentary side elevation showing an aircraft nose landing wheel equipped with a generator in accordance with the present invention.

Figure 2 is a similar view of an airplane main landing gear wheel equipped with a generator.

Figure 3 is a top plan view showing a generator bracket or clamp.

Figure 4 is a side elevation of a generator and bracket.

Figure 5 is a transverse longitudinal section on an enlarged scale, taken through a solenoid-operated valve assembly showing the valve mechanism in one operative position.

Figure 6 is a wiring diagram exemplifying electrical connections between aircraft landing wheel generators or the wheel generators of other vehicles and the solenoid valve assemblies, in a braking system in accordance with the present invention, and Figure 7 is a view similar to Figure 5 showing the valve mechanism in a different operative position.

The invention contemplates incorporation into the hydraulic or air pressure braking system of a vehicle an electro magnetically actuated control valve which is normally positioned to permit normal braking pressure to be transmitted equally to all of the wheels of the vehicle, and which is changed in position only when an electrical unbalance is produced in its circuit as a result of a stopping or a relative slowing down of any of the braked wheels of the vehicle while the brakes are applied, such as occurs in wheel slippage relative to the ground, such electrical unbalance is caused by a corresponding reduction in the electrical output of the electrical generators driven by the stopped or slowed wheel, so that the hydraulic or air pressure normally applying the brake on such wheel is automatically cut off and vented so as to put such wheel in an unbraked, free rolling condition until normal rolling contact of such wheel with the ground is resumed. As a result of these provisions, the danger, in the case of an aircraft landing upon a snow or ice-covered field, that brake-locked wheels will cause upsetting of the aircraft upon contacting hard ground affording normal traction, is reduced or eliminated; and in the case of railway vehicles, the sliding of brake-locked wheel or wheels on the rails with consequent production of flat spots on such wheels is prevented.

Referring to the drawings in detail, and in particular to Figures 1 to 4 thereof, the numeral 7 generally designates a clamp bracket composed of two loops 8 and 9, respectively, pivoted together at 10, one loop embracing the landing strut 11, in the case of the nose wheel 12 of Figure 1, or the landing strut 11a of one of the main landing wheels 12a, of an aircraft (not shown), and the other loop embracing an electrical generator 13, having a shaft 14 equipped with a tired wheel 15 bearing frictionally against the side walls of the landing wheel tire 16 or 16a, whereby the generator is driven as the landing wheel turns when in normal contact with the ground. A generally similar arrangement of generators 13 may be made in the case of a railway locomotive by attaching the nose wheel generator to the pilot axle, the nose wheel of an airplane and the pilot wheels of a locomotive having no brakes and being free to rotate at all times.

While, as pointed out above, the improved braking system may be applied to various types of wheeled vehicles, it is herein illustrated and described in connection with a conventional airplane by way of example. In such a conventional airplane the nose wheel 12 has no brake and is free to rotate at all times. The main landing wheels 12a are equipped with fluid-pressure operated brakes, usually hydraulic, and the airplane carries suitable means for supplying hydraulic fluid under pressure and pilot-controlled means for supplying such pressure fluid to the landing wheel brakes, and a fluid inlet and exhaust conduit connected with each brake. The present invention contemplates the interposition of a solenoid controlled valve between each brake and the pressure fluid and fluid return conduits leading thereto, and the application of respective electric generators to the two main landing wheels and the nose wheel to control such solenoid operated valves in accordance with a predetermined speed differential between said nose wheel and each of said landing wheels to preclude stopping or locking of either of said main landing wheels as long as said nose wheel is rotating.

A suitable solenoid actuated control valve is shown in detail in Figure 5, and generally indicated at 17. This valve comprises a generally cylindrical casing 18 formed with an axial bore providing a valve chamber or cylinder 19 closed at its outer end by a plug 20 through which the piston rod or valve plunger 21 extends. The opposite end of the bore 19 is closed by an apertured screw plug 33 and the bore is divided into two parts by an intermediate, apertured transverse partition wall 22 through which the corresponding end of the piston rod 21 extends.

The casing 18 has two longitudinally-spaced ports 23 and 24, leading into the bore 19 between end plug 20 and partition wall 22. Port 23 is a pressure-fluid port connected by conduit 23' to the outlet of the pressure-fluid supplying means through the pilot-control means, and port 24 is an exhaust or vent port connected by the fluid-return line 24' to the inlet of the pressure-fluid supplying means or a fluid reservoir or sump. A third port 25 extends through the casing wall midway between ports 23 and 24 and is connected by a pressure fluid conduit 25' to the corresponding wheel brake mechanism.

Valve plunger or piston rod 21 has three valve gates or pistons 26, 27 and 28 thereon and is slidable in the valve chamber portion of bore 19. The two end pistons 26 and 28 are spaced from the center piston 27 a distance slightly greater than the outside-to-outside distance between each of the ports 23 and 24 and the port 25.

When the valve plunger, including rod 21 and pistons 26, 27 and 28, is in its normal operative position, as illustrated in Figure 5, inlet port 23 is connected to brake line port 25 between pistons 26 and 27 so that pressure fluid can be applied to the brake by the pilot-operated fluid control. When the valve plunger is in its opposite operative position, or operated position, as illustrated in Figure 7, brake conduit port 25 is connected to the exhaust or vent port 24 between pistons 27 and 28 so that the brake is released.

Bleed openings 40 and 41 are provided in the casing wall, one near the plug 20 and one near the corresponding side of partition wall 22, to prevent trapping of air or other fluid in the ends of the valve chamber and provide for free sliding movement of the valve plunger in the valve chamber.

The portion of bore 19 between partition wall 22 and end plug 33 constitutes a chamber for a solenoid armature 30 and may be counterbored, if desired, to render it larger than the valve chamber.

Armature 30 is a laminated structure having a head 31 at its inner end connected to the piston rod 21 and a corresponding head 31' at its outer end. A helical spring 32 is disposed between armature head 31' and the end plug 33 and resiliently urges the valve plunger to the normal position shown in Figure 5. End plug 33 has a vent 34 therethrough and is secured in place by a lock nut 35. An air vent 35' is provided at the opposite end of the solenoid chamber so that the solenoid may reciprocate freely in this chamber.

The portion of cylindrical valve casing 18 between partition wall 22 and the end-receiving plug 33 is externally reduced in diameter and a pair of longitudinally-spaced-apart solenoid coils 36 and 37, are circumposed on this reduced portion 38 of the casing 18 surrounding the armature chamber 29. A cylindrical cover 39 encloses the coils and the reduced portion of the casing. The coil 36 at the outer end of the armature has one side thereof grounded, and the other side connected to the ungrounded side of the generator attached to the nose wheel 12. The coil 37 at the inner end of the armature has its ungrounded side connected to the ungrounded side of the generator of the corresponding main landing wheel 12a.

Armature 30 is materially shorter than the distance between partition wall 22 and end plug 33 and when in its normal position, is substantially centered magnetically relative to both coils 36 and 37 so that when substantially equal currents flow through both coils the magnetic attraction of the two coils on the armature substantially cancels and the valve plunger is held in its normal position by compression spring 32 and stop 52 which bears against the inner side of end plug 20. The armature, in its normal position, is out of magnetic center relative to coil 36 alone, however, and when the current flowing through coil 36 exceeds, by a predetermined amount, the current flowing through coil 37, armature 30 will be moved against the force of spring 32 to bring the valve plunger to the operative position illustrated in Figure 7 and described above.

As shown in Figure 6, control valves 17 are provided, one for each of the two main wheels 12a. Balancing rheostats 46 and 47 are connected to the corresponding solenoid coils 37 and 36, the rheostats 46 being connected together at 48 with the ungrounded side of the generator nose wheel 12.

The generators are connected to operate the solenoid actuated control valves 17, one of which is shown in detail in Figure 5, comprising a generally cylindircal casing 18 formed with an axial hydraulic or air piston chamber or cylinder 19 closed at its outer end by a plug 20, through which the piston rod 21 works. The inner end of the cylinder 19 is closed by a wall 22 through which the piston rod 21 works.

One side wall of the casing 18 has two longitudinally spaced ports 23 and 24, leading into the cylinder 19 and connected to the pressure line from brake control valve and to the return line to fluid reservoir, respectively. Between these ports and on the opposite side wall of the casing is the port 25 to which the line leading to the brake assembly is connected.

The piston rod 21 has a left hand piston 26, a right hand piston 27, and an intermediate piston 28 fixed thereon and sliding in the cylinder 19. In the normal position, shown in Figure 5, the piston 26 is to the left of port 23, the piston 27 to the right of port 24, and piston 28 between ports 23 and 24 and the rheostats 47 being separately connected, as indicated at 49 and 50, respectively, with the ungrounded sides of the generators of the main landing wheels 12a.

When there is an absence of slippage by the main wheels 12a, the solenoid coils balance and the piston assembly resides in the position shown in Figure 5. However, if either main wheel slides, the output of the associated generator falls and the related solenoid coils become unbalanced and coils 37 then shift the piston assembly to the operative position illustrated in Figure 1 so as to close the pressure inlet port 23 and open the return line between the brake on the sliding main wheel and the fluid sump, thereby releasing the brake until such time as the said wheel resumes normal frictional rolling contact with the ground and causes rebalancing of the related solenoid coils which results in the piston assembly being restored to its normal position illustrated in Figure 5.

For overriding the automatic brake releasing action of the control valve 17, mechanism may be provided in the form of a bracket 41 on the right hand end of the casing 18, on which is pivoted a bell crank 42 having one arm provided at its outer end with a fork 43 receiving the corresponding end of the piston rod and bearing against a pin 44 extending transversely through the piston rod. An operating cable 45 is connected to the other arm of the bell crank 42 and leads to a suitable control station (not shown).

By pulling the cable 45 the piston assembly may be moved to the right and returned to its normal position shown in Figure 5, after it has been shifted to the left as described above, so that normal brake functions can be made available at all times by the use of the emergency overcontrol bell crank 42.

I claim:

1. The combination with an aircraft having a nose landing wheel and two main landing wheels and a fluid pressure-operated braking system including individual brakes on said main landing wheels; of an electromagnetically operated control valve for each main landing wheel incorporated in said system and normally open to permit normal application of the brakes, said control valves in their operated position shutting off flow of pressure to the brakes and relieving the pressure therein to release the brakes, each of said control valves comprising an operating piston rod including an electromagnetic core, spring means returning said piston rod to normal position in which said valve is open, longitudinally spaced magnet coils surrounding said core with one of said coils connected to the nose landing wheel generator and the other coil connected to the related main landing wheel generator, said coils being magnetically balanced so as to retain said piston in normal position while said nose wheel and the related main landing wheel are rotating at similar speeds in contact with the ground so that the output of their generators is similar, said coils being adapted to be magnetically unbalanced whereby one of said coils can shift said piston to closed position whenever said main landing wheel stops rolling or its rolling speed is substantially reduced and a corresponding drop in the output of its generator takes place, whereby the brake of said main landing wheel is released.

2. The combination with an aircraft having a nose landing wheel and two main landing wheels and a fluid pressure-operated braking system including individual brakes on said main landing wheels; of an electromagnetically operated control valve for each main landing wheel incorporated in said system and normally open to permit normal application of the brakes, said control valves in their operated position shutting off flow of pressure to the brakes and relieving the pressure therein to release the brakes, each of said control valves comprising an operating piston rod including an electromagnetic core, spring means returning said piston rod to normal position in which said valve is open, longitudinally spaced magnet coils surrounding said core with one of said coils connected to the nose landing wheel generator and the other coil connected to the related main landing wheel generator, said coils being magnetically balanced so as to retain said piston in normal position while said nose wheel and the related main landing wheel are rotating at similar speeds in contact with the ground so that the output of their generators is similar, said coils being adapted to be magnetically unbalanced whereby one of said coils can shift said piston to closed position whenever said main landing wheel stops rolling or its rolling speed is substantially reduced and a corresponding drop in the output of its generator takes place, whereby the brake of said main landing wheel is released, said coils being arranged to become magnetically rebalanced so as to permit said spring means to restore said piston to normal open position thereby restoring pressure application of said main landing wheel brake whenever said main landing wheel resumes a rolling speed similar to that of said nose landing wheel.

PAUL O. MORRISON, Jr.

REFERENCES CITED

The following references are of record in the file of this patent:

UNITED STATES PATENTS

| Number | Name | Date |
| --- | --- | --- |
| 2,025,889 | Pardee | Dec. 31, 1935 |